United States Patent
Duellings et al.

(10) Patent No.: US 11,004,049 B2
(45) Date of Patent: May 11, 2021

(54) METHOD AND DEVICE FOR CONTROLLING A CASH REGISTER SYSTEM

(71) Applicant: Wincor Nixdorf International GmbH, Paderborn (DE)

(72) Inventors: Peter Duellings, Schönwalde-Glien (DE); Uwe Kirschke, Berlin (DE); Martin Sommer, Berlin (DE)

(73) Assignee: Wincor Nixdorf International GmbH, Paderborn (DE)

( * ) Notice: Subject to any disclaimer, the term of this patent is extended or adjusted under 35 U.S.C. 154(b) by 835 days.

(21) Appl. No.: 15/510,514

(22) PCT Filed: Aug. 24, 2015

(86) PCT No.: PCT/EP2015/069355
§ 371 (c)(1),
(2) Date: Jul. 17, 2017

(87) PCT Pub. No.: WO2016/037841
PCT Pub. Date: Mar. 17, 2016

(65) Prior Publication Data
US 2017/0364887 A1    Dec. 21, 2017

(30) Foreign Application Priority Data

Sep. 11, 2014    (EP) .................................... 14184437

(51) Int. Cl.
*G06Q 20/20*    (2012.01)
*G07G 1/00*    (2006.01)
*G07G 1/14*    (2006.01)

(52) U.S. Cl.
CPC ......... *G06Q 20/202* (2013.01); *G07G 1/0009* (2013.01); *G07G 1/0018* (2013.01); *G07G 1/0081* (2013.01); *G07G 1/14* (2013.01)

(58) Field of Classification Search
None
See application file for complete search history.

(56) References Cited

U.S. PATENT DOCUMENTS

| | | | |
|---|---|---|---|
| 2011/0115914 A1* | 5/2011 | Bailey | G06Q 10/00 348/150 |
| 2012/0066079 A1 | 3/2012 | Falzone et al. | |
| 2012/0233006 A1* | 9/2012 | St. George | G07G 1/0018 705/18 |
| 2013/0346027 A1 | 12/2013 | St. George et al. | |
| 2014/0019274 A1 | 1/2014 | Hardin | |

FOREIGN PATENT DOCUMENTS

EP    2 680 243 A1    1/2014

OTHER PUBLICATIONS

International Search Report dated Sep. 3, 2015, for corresponding International Application PCT/EP2015/069355.

* cited by examiner

*Primary Examiner* — Fateh M Obaid
(74) *Attorney, Agent, or Firm* — Black, McCuskey, Souers & Arbaugh LPA

(57) ABSTRACT

A method for authorizing an action on a self-service system, in which a user is authorized, by using an authorization server, to carry out an action on a self-service system is provided. The user is equipped with a token for his/her identification.

9 Claims, 5 Drawing Sheets

METHOD AND DEVICE FOR CONTROLLING A CASH REGISTER SYSTEM

CROSS-REFERENCE TO A RELATED APPLICATION

This application is a National Phase Patent Application of International Patent Application Number PCT/EP2015/070731, filed on Sep. 10, 2015, which claims priority of European Patent Application Number 14184752.5, filed on Sep. 15, 2014.

BACKGROUND

The present invention is in the field of checkout systems/point of sale (POS) systems and in particular checkout/paydesk/cash point systems, such as those used in the wholesale and retail trade.

Traditional POS systems essentially consist of a known PC or comprise elements known from the PC technology on which software is implemented for providing a POS functionality, as well as other units connected to this PC, such as a scanner, keyboard, printer, monitors and cash drawer.

A disadvantage of such traditional POS systems is, among other things, the lack of mobility and the limited usability of these a POS systems which in particular in larger wholesale and retail stores leads to the need to provide a large number of fully equipped POS systems at fixed locations. This is not desirable with regard to the relatively high price for the required PC. As a result, storage space is furthermore wasted, since 100% utilization of the POS systems is not always given.

It is an object of the invention to provide a POS system with which a high mobility, usability and utilization of the POS system can be ensured.

This object is achieved by a device having the features of claim 1 and by a method having the features of the independent method claim.

Advantageous further embodiments of the invention are specified in the dependent claims.

In essence, the invention comprises a POS system that is comprising a stationary unit which is connected to at least one POS peripheral unit via at least one connection. Furthermore, the POS system comprises a mobile unit which comprises a display device as well as an input device, wherein the mobile unit is configured to execute a POS software, wherein in said process an access to the POS peripheral unit takes place. The POS peripheral units can be one or more of the following components: an automatic cash safe, a cash drawer, a printer, a keyboard, a scanner, a 3d scanner, a pin pad (over LAN), a card reader, a monitor, a line display, a scale, a NFC reader, a banknote deposit device, a banknote disburse device, a coin deposit device and/or a coin disburse device.

Another component of the POS system is a management unit. The goal is to provide a mobile unit with one or more POS peripheral units by means of the stationary unit. In order for such access not to take place in an uncontrolled manner, there exists a management unit which controls the access of the mobile unit to the POS peripheral units and the stationary unit.

The mobile unit can be connected to the stationary unit via a first connection. This connection may, on the one hand, be a radio connection via which data is exchanged that is to be sent to the POS peripheral units, and also the data necessary for authentication. On the other hand, it can also be a contact connection, by which a physical contact of the two units is produced, and via which, in one embodiment, only authentication data is exchanged. In a further embodiment, data is exchanged for the POS peripheral units via a second contact connection. It should be noted that these connections should preferably work within a narrow radius between the stationary unit and the mobile unit in order to avoid an excessive removal of the mobile unit from the stationary unit in order to keep the cash drawer in sight. Here, the Bluetooth Low Energy (BT LE) Beacon technology can be used, since it is possible to scale the transmitter range within a range up to 10 m. For wireless standards these should therefore be selected that work in a narrow spatial range.

Furthermore, the mobile unit is connected to the management unit via a second connection. Said connection is generally used to exchange access information and parameters that control the access to the POS peripheral units.

The stationary unit is also connected to the management unit via a third connection. This connection also essentially serves to control the access of the mobile unit to the POS peripheral units. Through these connections, both the mobile unit and the stationary unit are controlled by the management unit in order to obtain access to the POS peripheral units.

For this purpose, the management unit is set up to check, based on a rule set, whether a first logical connection of the mobile unit to the stationary unit and/or a second logical connection of the mobile unit to the at least one POS peripheral unit is to be established, and if the check is successful, an access is permitted via the logical connection of the mobile unit to the stationary unit and/or an access via the logical connection of the mobile unit to the POS peripheral units, and the management unit detects a corresponding logical connection of the devices. In this context, a logical connection is a connection which can actually be physically performed via several different protocols and network technologies but appears to the mobile unit as a connection via a local interface with a local interface protocol. By way of example, a virtual RS232 or USB port, which is implemented as a virtual driver on the mobile unit, can thus be provided as a standard interface for the application software. This virtual interface is then used to connect to a POS peripheral unit using different network protocols and the stationary unit. For example, the actual connection can be established via a network, so as to be then converted by the stationary unit into a serial interface or a USB interface by which the POS peripheral unit is connected to the stationary unit. For the mobile unit, it appears as if the POS peripheral unit would be directly connected to the mobile unit. However, there is a physical link across multiple protocols and networking technologies. A virtual COM port is an emulation of serial RS232 interfaces (real COM ports), which are implemented by means of an operating system driver and emulate all calls to peripheral devices and their return messages.

The driver can receive data from the application in the same way as the driver for a physically available, serial RS232 interface (WRITE). In the case of the virtual RS232 interface the data is however passed on to another computer via wire-wired or wireless communication. RS232 Control signals such as DSR which indicate whether a RS232 device is connected to the computer, are virtualized by the driver assigned to the virtual COM port, such that if an connection interruption via the network occurs, these signals are emulated accordingly. Thus, the real RS232 driver and the virtual RS232 driver are transparent to the application. The application therefore cannot distinguish between a peripheral device physically connected to the computer via an RS232 cable, or whether it is a virtual RS232 driver, which carries out the communication via a network with the other computer and the data traffic to a connected device Peripheral device.

Thus, the virtual COM port wirelessly or wire-bound replaces a conventional serial wire-bound connection without software modification of the upper layers.

In a preferred embodiment, the rule control system is implemented by software on the management unit and stored there on. Processors, memory, persistent storage, operating system and databases can be combined. The data can be stored in a database and determine certain access rights. An ID which is associated with the mobile unit and the stationary unit can be recorded in the set of rules. Using this ID, the mobile unit and the stationary unit can be uniquely identified and it can be determined whether certain devices may be combined with one another. In addition, there is also an ID for the POS peripheral units. In this way, it can be mapped which components are logically connected. Furthermore, said rule set also manages the current status of the connections. Based on the current status, the rules can decide which POS peripheral unit can be connected to which mobile unit. A multiple assignment is thereby excluded. Also, certain categories of POS peripheral units should not be connected to mobile units when the mobile units are not in immediate surroundings. If for example, the mobile unit is at a too far away, such that there is no radio contact with the stationary unit, the stationary unit then notifies the management unit thereof, and the management unit and/or the stationary unit can then decide that the assignment of certain POS peripheral units is cancelled. Money dispensing units can for instance considered to be important POS peripheral units. Hereby it should be avoided that mobile units which are too far away from the money dispensing unit, can be controlled in order to output money. The response behaviour is also regularly checked. If too large latencies occur, this is an indication that the connection is not optimal or too far apart, such that an assignment is cancelled. One additional aspect that can be included in the rule set is the user ID that a user should provide when logging-in on to the mobile device. Further aspects may be the type of the mobile unit and the stationary unit or their configuration. For example, certain software development or hardware development levels may cause certain connections to fail. A variety of further rules are conceivable.

In a further possible embodiment, the mobile unit is connectable to the stationary unit via the connection. This connection between the mobile unit and the stationary unit can be carried out both wirelessly and via physical contacts, as stated above. When the connection is established, a request is sent to the management unit such that the management unit checks, by means of the rule set, whether a connection of the mobile unit to the stationary unit and/or its POS peripheral unit is permitted, and if it is permitted, the management unit transmits a corresponding message to the mobile unit and/or the stationary unit to allow access via the logical link.

In a preferred embodiment, the management unit should receive both a request for the connection from the mobile unit and at the same time a request about the connection from the stationary unit to allow access via the logical connection. In this case, both devices transmit the respective ID of the partner and their own ID with a time stamp to the management unit. Based on these parallel data, the management unit can specify a time window within which the request must be transmitted. If the requests from both devices arrive within the time window, both devices are accordingly informed that an access is permitted on the basis of the rule set. In this case, corresponding information is sent to the mobile unit so that the corresponding virtual drivers can be configured. The configuration is done automatically. A corresponding message is sent to a stationary unit. The stationary unit then releases the corresponding POS peripheral unit for the mobile terminal so that an access can be accomplished.

The mobile unit and/or stationary unit are designed to exchange their ID via a contact connection or via a wireless short-range connection such as NFC, RFID, Zigbee, Bluetooth and/or Bluetooth Low Energy to be transmitted via a network such as WLAN, Ethernet, Bluetooth to the administration server.

The connection between the individual units is preferably encrypted, the keys being exchangeable with one another via a different channel. Due to the triangle connection of the units, such a channel is normally available. Encryption can be either symmetric or asymmetric. Alternatively, the keys may be generated and managed by the management unit. In one embodiment, the use of signatures and a new PKI (Public Key Infrastructure) is also conceivable. Identity Based Encryption can also be based on the ID. Alternatively, the keys can also be exchanged with one another via a USB stick or other storage media in advance or during the configuration. Alternatively, said process can also be done by a highly secure key generation via interchangeable SmartCards.

After establishing the connection between the mobile and stationary unit, the connection is made from the stationary unit and/or mobile unit to the management unit via LAN, WLAN or Bluetooth. However, the connection of the mobile unit to the stationary unit requires a spatially limited network, preferably Bluetooth, Bluetooth low energy, Bluetooth low energy iBeacon™, Zigbee or a cable connection e.g. plug connection. However, it is also conceivable that a WLAN is used, but only a limited number of uncritical POS peripheral units, such as a printer or a display unit, are provided. Due to the classification or rating of the POS peripheral units, uncritical devices can thus be addressed if a network standard is used between the stationary unit and the mobile unit which permits a greater distance.

In a further embodiment, the management unit is embodied as a logical unit in the POS HUB/stationary unit. The management unit is preferably separated from the stationary unit, logically or physically. This may be implemented by an additional hardware, or by virtualization, such that the management unit operates as a virtual system on the hardware of the stationary unit. Therefore, there are a plurality of stationary units, out of which one is the master unit having the management unit. Alternatively, a plurality of management units are conceivable, out of which each operates redundantly and exchanges data with each other, such that in the event of a failure of one management unit, another management unit can take over the function.

In another embodiment, the mobile unit is configured to allow interactive selection of a stationary unit and/or POS peripheral units. In this case, an application is provided to the user, which scans the surrounding area in order to list the stationary units available there. The list of the stationary units is then also be restricted by inquiry of the management unit, so that only the stationary units which allow a connection are displayed. In addition to the stationary units, their POS peripheral units are displayed, and the user can assign the individual units to his mobile unit by a selective selection. As soon as a corresponding selection has been made, the above-described process proceeds, in which a corresponding logical connection is established to the POS peripheral units.

The proximity of the stationary device is provided by means of an autonomously supplied transmitting unit (e.g., Bluetooth Low Energy iBeacon™ or nearables). Said unit is supplied by a small battery and cyclically transmits data with the unique identification number of the respective stationary unit to the mobile unit.

In a further embodiment, the mobile unit may be physically connected to the stationary unit. This is for instance possible by a plug-in contact. As soon as such a connection is established and a corresponding assignment of the stationary unit to the mobile unit by the management unit has taken place, the mobile unit is physically interlocked with the stationary unit. A physical interlock is performed by an actuator after physically connecting the stationary unit to the mobile unit, the interlock being controlled by the management unit according to a rule set. Alternatively, the interlock can be automatically performed without using the rule set of the management unit. The rule set can determine that only specific users are allowed to release this interlock by means of a corresponding command.

Another part of the invention is a method implemented by the described device. In this case, the communication is between the stationary unit and the mobile unit and the management unit. The management unit controls the allocation of the mobile unit to the stationary unit and its POS peripheral units. Only if the rule set, which has also been described above, allows a connection, the desired POS peripheral units are assigned. By the assignment, the mobile unit and stationary unit then establish a logical connection to the POS peripheral unit, which is formed on the mobile unit such that it appears as a physical direct connection for the applications. For this purpose, a corresponding virtual driver is configured in such a way that it transmits its data either directly or indirectly via the stationary unit to the POS peripheral unit.

According to the invention, the POS system comprises a mobile unit that is comprising a display device, as well as an input device, wherein the mobile unit is configured to execute a POS software. Furthermore, the POS system comprises a stationary unit which is connected to at least one POS peripheral unit. Furthermore, the POS system comprises a management unit. The mobile unit can be connected to the stationary unit via a first connection and can be connected to the management unit via a second connection. The stationary unit is connectable to the management unit via a third connection. Furthermore, the management unit is set up to establish a first logical link of the mobile unit to the stationary unit and/or a second logical link of the mobile unit to the at least one POS peripheral unit.

One basic idea of the present invention resides in the breakup of the strict allocation from one unit executing the POS software to the remaining POS peripheral units. By separating the mobile unit according to the invention, on which the POS software is executed, from the remaining POS peripheral units, it is advantageously achieved that one and the same POS peripheral units can be used by several mobile units. Since, the operation of the POS software performed by the user of the mobile unit—for example the registration of the goods selected by the customer or the preparation of the invoice generation—is the most significant time component in contrast to the final processing which presupposes the existence of the POS periphery units—for example, printing the receipt, processing the payment process, a better utilization of the POS peripheral unit can be achieved. This inter alia leads to a reduction in costs and to a saving in foot-printing, since fewer POS peripheral units have to be used. Furthermore, such a separation from the mobile unit executing the POS software from the rest of the POS peripheral unit units allows an improved customer support and handling of the purchase as the users of the mobile unit can accompany and advise the customer in the business premises as well as the purchase of the goods selected by the customer can already be prepared here.

According to the present invention, a user of the mobile unit makes a purchase and uses the POS peripheral unit only for the final processing. For this purpose, according to the invention, with the aid of the stationary unit, a connection is established between the mobile unit and the POS peripheral unit that is connected to the stationary unit such that the POS software executed on the mobile unit can access the POS peripheral units connected to the stationary unit. In order to establish this connection, the management unit according to the invention is required, which controls the allocation of a mobile unit to a stationary unit and/or to the associated POS peripheral unit. If such a connection is to be established, it is advantageous to check whether a particular mobile unit and/or a user operating this unit is allowed to access at least one particular stationary unit or at least a particular associated POS peripheral unit. As a result, it can advantageously be avoided that the same POS peripheral unit is simultaneously used by different mobile units and/or that unauthorized users operate a particular POS peripheral unit (for example, open the cash drawer).

The POS system preferably is a POS system for wholesale and/or retail trade. It is preferably connected to a database containing information of the goods to be sold and/or on the transactions carried out on a POS system. Such information is preferably the stock of the goods, price of the goods and/or information on the packaging of the goods, such as volume and/or color.

The mobile unit may be any portable device which allows the execution of a POS software and has at least one display device, as well as at least one input device. In a preferred embodiment, the POS software is executed on the mobile unit. The mobile unit is preferably operated with power from an accumulator. The display device for displaying information is provided by the POS software. It is preferably a screen, more preferably an LCD or OLED display. The input device serves to input information by the user of the POS system. The input information is preferably intended for the POS software. Preferred input devices are scanners, keyboard and/or touch screen. The mobile unit is preferably designed as a portable PC. More preferably, the mobile unit is formed as a so-called tablet computer (tablet PC). Further, the tablet computer preferably has a touchscreen which advantageously serves as a display and input device, simultaneously.

The POS software is preferably the same or a slightly adapted application which already has been installed on complete stationary units. The goal is to make as few changes as possible to the software, but to achieve the highest possible variability. This can be achieved if the same operating system is running on the mobile unit and on the traditional POS system, e.g. Windows or Linux. However, in a further embodiment computers can also be used as mobile units, which can, for example, run tablets or SmartPhone operating systems, e.g. Linux, Unix, iOS, Blackberry and Android.

The stationary unit serves to connect the at least one POS peripheral unit. As a stationary unit, any conventional PC can be considered, in particular a minimally equipped and therefore a low-cost PC. The stationary unit preferably serves as a charging unit for the accumulator of the mobile unit. The at least one POS peripheral unit is connected to the stationary unit via a connection. This connection can be of any type to ensure data exchange between the POS peripheral unit and the stationary unit, for example via a wireless, wire-bound or optical connection. A permanent connection is the preferred connection, and more preferably a wire-bonded connection. Most preferred POS peripheral units and stationary units are connected via USB and/or RS232 connections.

POS peripheral unit or POS peripheral units are preferably an automatic cash safe, a cash drawer, a printer, a keyboard, a scanner, a 3d scanner, a pin pad, a card reader, a monitor, a line display, scale, a NFC reader, a banknote deposit device, a banknote disburse device, a coin deposit device and/or a coin disburse device.

The management unit serves to manage the access of the mobile unit and/or the POS software executed thereon to the POS peripheral unit connected to the stationary unit. The management unit may be a conventional PC, or preferably implemented as a server. The management unit is preferably designed as an independent unit, but can also be integrated into the stationary unit. The first scenario is advantageous if the POS system according to the invention is to be integrated into an environment in which a server is already used and/or if a larger number of mobile and/or stationary units are to be managed. The latter scenario is advantageous if such a server is not already present, because the costs for such a server can be saved, and/or only a smaller number of mobile and/or stationary units are to be administered. Here, it is sufficient to integrate the management unit into one of the stationary units that is used.

The invention described herein allows the reuse of existing application program architectures from a traditional POS system in a mobile device and secures comparatively unsecure wireless communications to these devices, in contrast to the physical connection of POS peripheral units, against tapping and manipulation.

Previous wire-bound interfaces are replaced by a software stack and interference-free wireless transmission technology (e.g., WLAN in combination with Bluetooth or ZigBee), wherein authentication may take place wirelessly or wire-bound.

BRIEF DESCRIPTION OF THE DRAWINGS

The figures briefly described below are referred to in the following detailed description of possible embodiments.

It shows.

DETAILED DESCRIPTION

Figure 1:
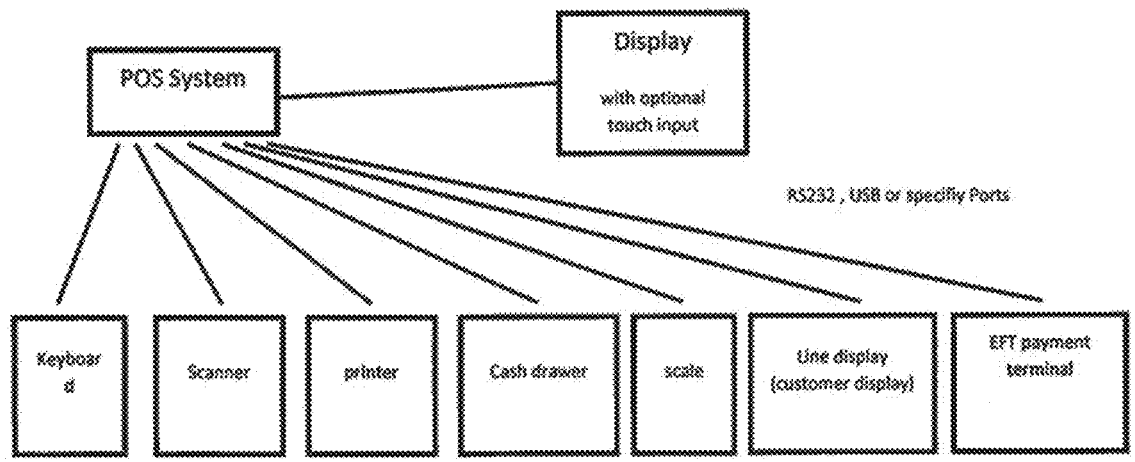
FIG. 1 is a conventional POS system according to the prior art in which the POS system is connected to a series of POS peripheral units and has a fixed monitor.

FIG. 1 shows a conventional POS system, according to the prior art, with a stationary POS system, which is connected by cable connections to different POS peripheral units. This POS system usually has a screen which, in a preferred embodiment, allows a touch input. The stationary POS system, also known as the stationary unit, is connected to a keyboard, scanner, printer, cash drawer, scale, line display or an EFT payment terminal via an RS232, USB or special ports.

A traditional POS system thus essentially consists of:
the POS system itself, which consists of a PC-like computer with a certain amount of USB, RS232 and special port connections for the peripheral units;
various peripheral units, such as a bond printer, an EFT terminal for payment, a label reader (scanner), a multi-line customer display (line display), an automatic cash safe, printer, keyboard, scanner, 3D scanner, card reader, monitor, scale, NFC reader, banknote deposit device, banknote disburse device, coin deposit device, coin disburse device and/or a cash drawer;
a screen for displaying operator dialogs for the user. Often also with a so-called touch input, so that the user can operate the displayed dialogues with the finger directly;
in addition, also a keyboard for the user e.g. to enter article numbers can be connected. With the increased use of mobile devices, the demand for the use of mobile devices at the POS workplace also becomes important. Current procedures usually require changes in two thematic areas, which are complex and cost-intensive:
a new adaptation of the application program in order to access peripheral devices is necessary.
an adaptation of the connection type of peripheral devices, e.g. Instead of USB and/or RS232 now an Ethernet connection, is necessary.

Figure 2:
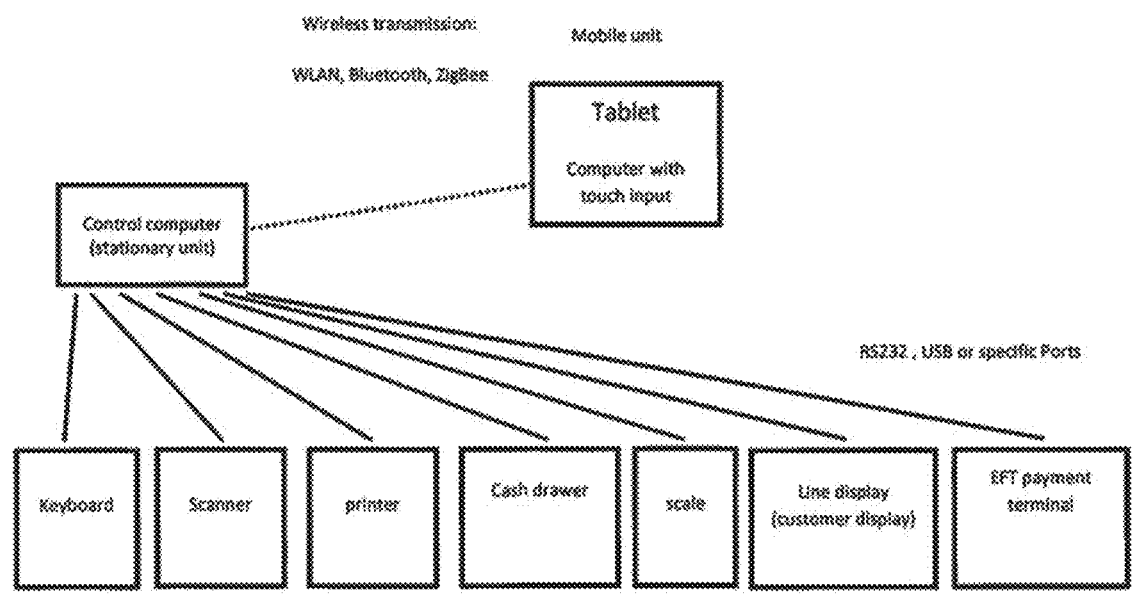
FIG. 2 shows the structure according to the present invention wherein a control computer takes the function of a stationary unit and a tablet computer takes over the function of the mobile unit connected by a wireless connection.

FIG. 2 shows the modified form, in which the POS system consists of two components: a mobile unit which is preferably designed as a tablet and has a touch-sensitive input device. This mobile unit is preferably connected to a control computer via a wireless connection, also referred to as a stationary unit, which is then in turn connected to the POS peripheral units.

The invention presented here makes it possible to continue using the systems in both thematic areas.

The tablet can have the same operating system as the PC-like computer used at the POS. Other operating systems such as Linux, Unix, iOS, Blackberry or Android are also possible. The management unit may employ an operating system which corresponds to the operating system of the tablet or use an alternative operating system from the above-mentioned list.

Figure 6:
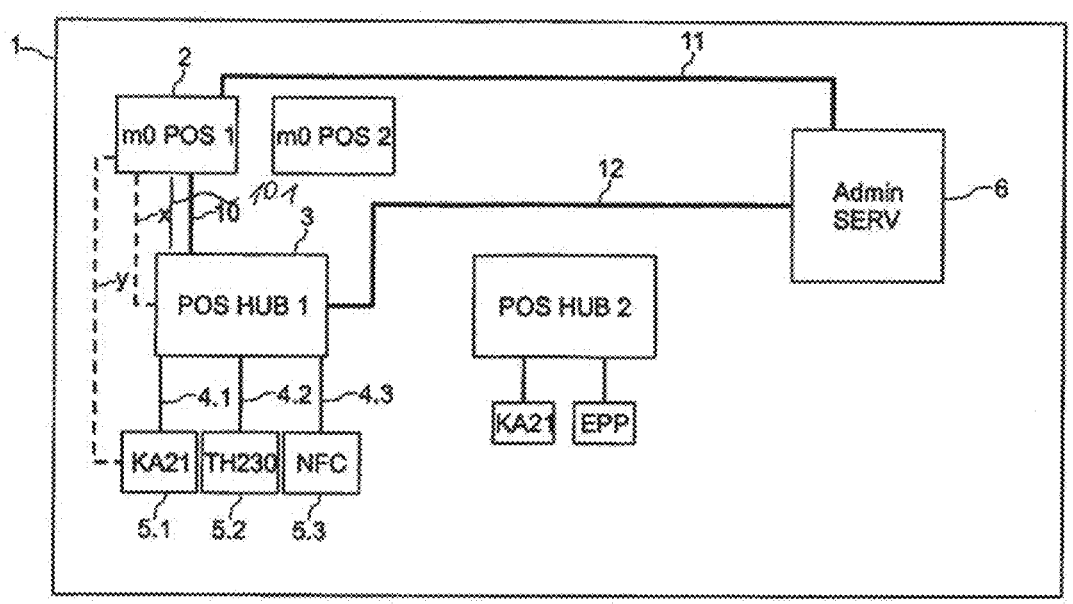
FIG. 6 shows the physical connections and logical connections of the mobile and stationary units of the present invention.

FIG. 6 shows the POS system 1, which consists of one or more mobile units 2 (moPOS1, moPOS2). Further constituents are one or more stationary units 3 (POS HUB1, POS HUB2), which are respectively connected to POS system peripherals units 5.1, 5.2, 5.3 via connections 4.1, 4.2, 4.3. Furthermore, there is also an administration unit 6 (administration server) which is connected via a connection 11 to the mobile unit 2 and via a connection 12 to the stationary unit 3. Furthermore, there is at least one connection 10 between the mobile unit and the stationary unit. In a preferred embodiment, there is also a connection 10.1, which is to be considered in particular when the devices are physically connected to one another, in particular when the mobile unit is inserted into the stationary unit. Access to the POS peripheral units takes place via the logical connections X or Y, wherein the physical access usually being via the connection 10 and 4.1, 4.2, 4.3.

Figure 3:
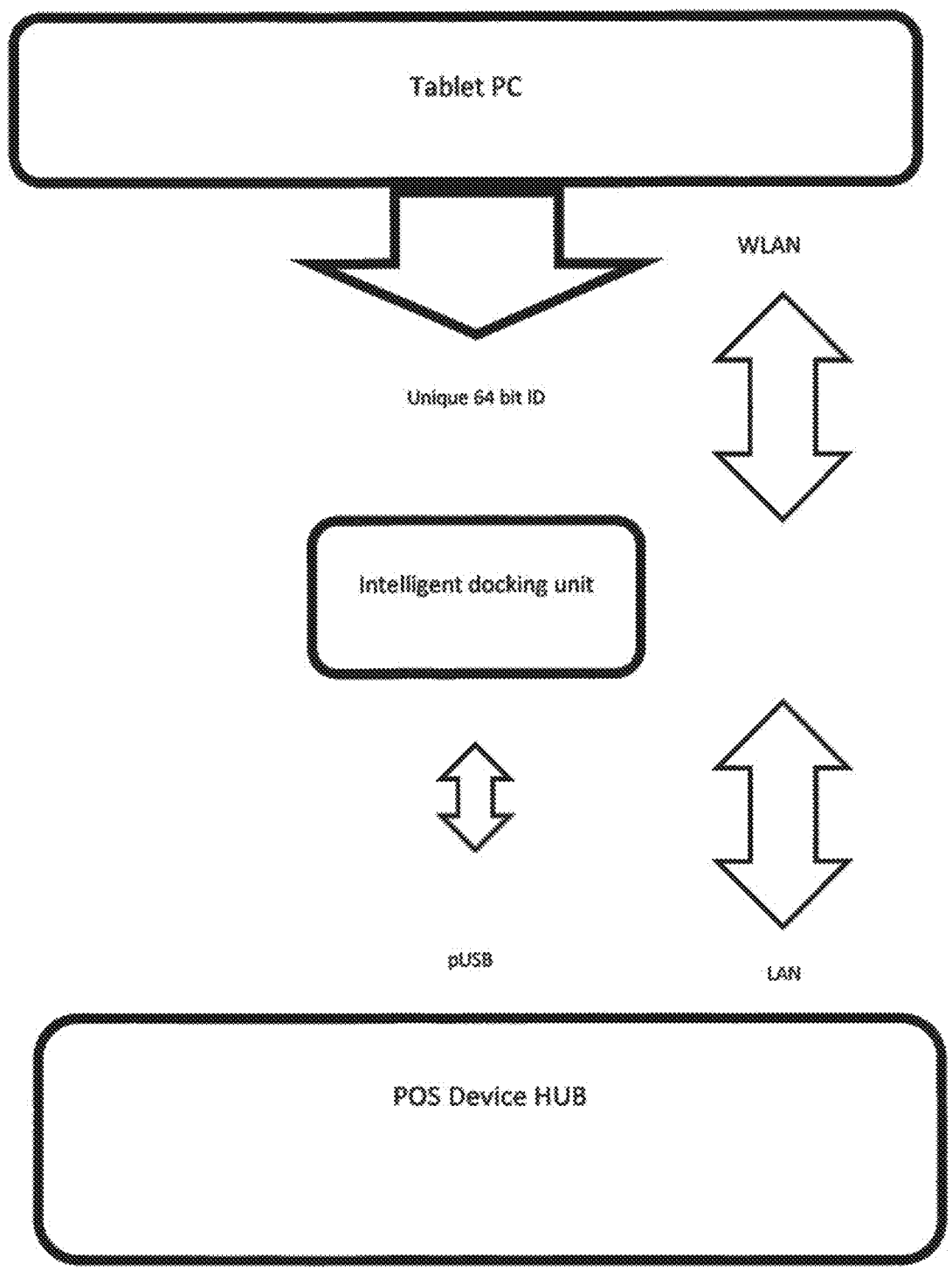
FIG. 3 shows the connection of the mobile unit (Tablet PC) to the stationary unit (POS device HUB), wherein an ID is exchanged during the connection.

FIG. 3 shows a contact-related authentication. If the tablet PC/mobile unit is plugged into the intelligent docking unit/ stationary unit, an ID data exchange between the microcontroller integrated in the tablet PC (via the two contacts (any other number of contacts is also possible) is performed on the tablet and the docking unit (ULPMC) and the microcontroller in the intelligent docking unit. A 64 bit (unique ID) is transmitted as identification/authentication of the tablet. The intelligent docking unit transmits this ID via USB to the POS device HUB/stationary unit.

Alternatively, contactless authentication is conceivable. There are various possibilities for authentication, e.g.:
reading an NFC tag on the docking unit using the NFC reader integrated into the tablet,
reading of an RFID tag attached to the tablet by means of a Mifare reader connected to the POS device HUB/ stationary unit,
reading in of a Tablet ID through a contact-connected connection between the tablet and the docking unit.

The ID or identification of the tablet and the logical ID of the POS device HUB can now be sent via LAN to an administration server/administration unit.

In order to increase security, the tablet ID is exchanged between the tablet (mobile unit) and the administration server on different transmission paths (contact-bound and/or wireless).

Figure 4:
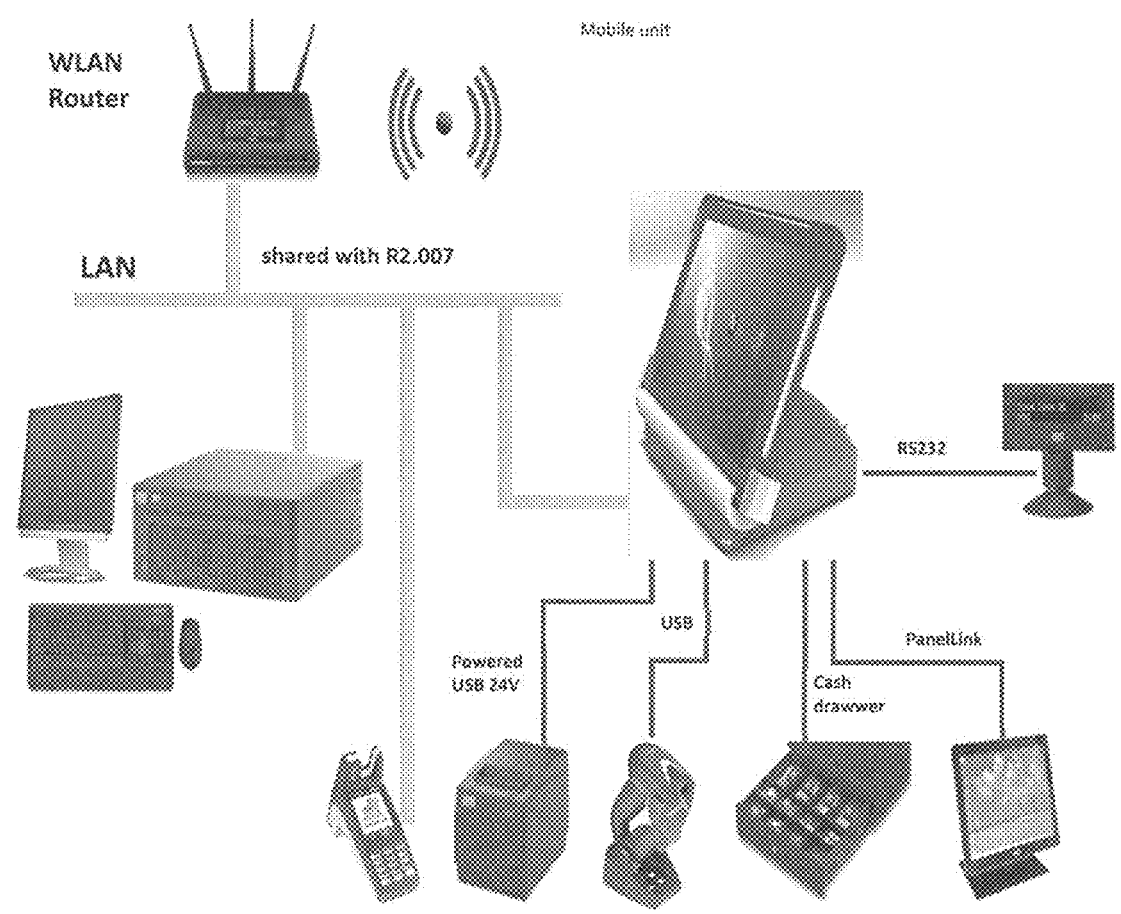
FIG. 4 shows a possible structure of the present invention and the nature of the network interfaces including the management computer.

The management unit checks whether this specific tablet/ mobile unit is allowed to access the peripherals/POS peripheral units on the POS device HUB. This information is transferred to the POS application running on the tablet PC via a WLAN access point (FIG. 4). Thus, the peripherals are logically connected (docked) to the Tablet PC and the POS application can access the devices.

For other tablet PCs the access is denied, and this state is indicated by an LED on the docking unit of the stationary unit (POS HUB) until the peripherals are released again, or a time-out situation occurs and the pairing is interrupted after a message from the tablet or the tablet POS-Device HUB to the administration server.

For this purpose, the peripheral devices are not connected to a POS system but rather to the substantially simpler POS device HUB computer (stationary unit) (FIG. 2, FIG. 4, FIG. 6). A small operating system can run on this stationary unit.

For the data transmission from the peripheral device to the application program, a multiplexer program which receives data from all peripheral devices, transmits them via the wireless transmission path to the mobile device (tablet) in packets with a device identifier on the control computer (stationary unit). Therefore, the package identification is read with a corresponding demultiplexer program. The individual packets are unblocked according to the packet identification and distributed to so-called virtual RS232 ports, which offer the same interface in the direction of the application program for the peripheral devices. A virtual RS232 port is assigned to each of the peripheral devices. The virtual RS232 port is realized by a program which on the operating system treats the same application program calls that are used on the traditional POS system for connected RS232 devices.

The same procedure takes place for data transmission from the application program to the peripheral device, but the multiplexer program runs on the mobile device and the demultiplexer program runs on the control computer. In the same way, the data is transmitted in packets with peripheral identification via the wireless transmission link:

The application calls a WRITE, which transports the data to the virtual RS232 port program. This transports the data to the multiplexer program, which then transmits it as a packet with a device identifier via the wireless transmission link. The packet is received at the control computer, wherein the packet identification in the demultiplexer program is evaluated and sent to the addressed peripheral device.

As wireless communication, industrial standards such as Wireless LAN (WLAN), Bluetooth, Bluetooth Low Energy, Bluetooth Low Energy Beacon Technology or ZigBee can be used. The question of which industrial standard is suitable also decides whether the wireless transmission path guarantees latencies (better: response delays) that are shorter than the times which are implemented in application and software layers as timeout times for access to RS232 devices. These are usually within the ten millisecond range and can be achieved with some standards.

WLAN is used here because of the higher range for peripheral devices which are regarded as not time-critical, while Bluetooth or ZigBee is used for communication with devices which have to be treated with a fixed maximum response time (see above). Bluetooth or even ZigBee offer a better interference-free transmission as WLAN, however, depending on the selected device class, at shorter distances.

This results in the advantage of maintaining a short distance between the mobile device and devices which are critically to be handled in a financial manner, such as the cash drawer (safe). The user is thus forced to stay in the vicinity of the cash drawer when it is opened.

Data traffic under Bluetooth or other wireless local area connectivity technologies should be protected against possible manipulation by means of an additional software layer (e.g. RSA encryption). The receiver key is transmitted on a different data path as a Bluetooth or ZigBee (e.g. WLAN).

In order to guarantee the required monitoring-proof and tamper-proof transmission to the peripheral devices, the payment terminal and the cash drawer, the packets are encoded inside the multiplexer and demultiplexer program according to a symmetrical or asymmetrical encryption method, in particular. In order to increase security, the key exchange between the tablet and the control computer is done on an alternative transmission path. This can either be wireless, but with an alternative industry standard that is not used for regular data transfer, or otherwise by data transfer (e.g. USB stick) which has to be inserted at the tablet and at the control computer with every key exchange, or also via another route, e.g. through the management unit/administration server.

The application program on the tablet can directly access the POS peripheral units on the virtual RS232 ports provided here with the multiplexer and demultiplexer program. Herein, it is hidden from the application program that a wireless communication is used.

Since there generally is a device control layer below the application program which allows the control of USB peripherals and their RS232 variant in the same way, USB devices can also be controlled via virtual RS232 ports without an application program change. The same also applies to devices which are controlled by special physical connection types.

Furthermore, alternative wire-bound or wireless connections to another peripheral set are conceivable.

Alternatively, a mobile device can connect, e.g. by an installation parameter or by a separate dialog, with another control computer, thus accessing a different POS peripheral unit set.

The control computer only allows the connection with one mobile device to avoid the fact that several users are simultaneously accessing e.g. a cash drawer or perform a printing job. A change can always take place after the completion of a receipt transaction. To do this, the mobile device connected before must disconnect before another mobile device can log on.

The logon and logout of a mobile device to the control computer also takes place by means of data transmission with a symmetrical or asymmetrical versification/encryption. The necessary key exchange is performed in the same manner as described above. The above-described rule set on the management unit finally decides which mobile unit is allowed to connect with which stationary unit and thus also the interlocking of the mobile unit is triggered. In addition, it is also possible to define which mobile unit is allowed to connect with which peripheral device at a stationary unit.

The rules evaluate parameters such as e.g. current time, individual user authorizations, permitted or forbidden assignments of mobile units to the stationary unit ("black list" or "whitelist"), and occupancy status of the stationary unit.

To do this, the rule set can use a database with certain tables.

Here is an example of a possible simple rule set. The control parameters are stored in a database in the form of tables which are then evaluated by the rules in order to make the decision as to whether a connection is valid or not.

Example

TABLE 1

| Listing of all participating devices: | | | | | |
|---|---|---|---|---|---|
| # | Name | typ | network-address TCP/IP | ID | connection-state |
| 1 | tablet1 | mobile | 196.168.0.10 | 2723ebaf | |
| 2 | tablet2 | mobile | 196.168.0.11 | 2723ebae | devicehub1 |
| 3 | devicehub1 | fixed | 196.168.0.20 | abef1234 | tablet2 |
| 4 | devicehub2 | fixed | 196.168.0.21 | Ffefabab | |

Table 1 lists all devices and the current connection status of all mobile and stationary units involved.

In the event that a permitted connection could be established between two units—that is, the authentication was successful—the name of the other station, which is connected to the relevant station, is entered in the column "connection-state" 3).

When the connection is resolved, the entries in the "connections-state" column are deleted again.

The following rule is used as a first rule to determine whether a connection is valid:

In principle, only connections between two units should be permitted if one unit is a mobile unit (column "type" contains the value "mobile") and the other unit is a stationary one (column "type" contains the value "fixed"). If this is not the case, the connection is rejected.

In principle, only connection requests from units are permitted if the sender has a TCP/IP address that is contained in the table. If the TCP/IP address is not found, the connection is rejected.

Furthermore, the ID which should have a minimum length of 64 bits is compared with the one listed in the "ID" column. If it is not found, the connection request is rejected.

If both units—the mobile and the stationary unit—are used with two IDs during the authentication request, both IDs are compared. If one of the IDs is not coherent or does not match the TCP/IP address, the connection is rejected.

Further verifications of the authenticity of the requesting unit via its so-called network MAC address beside the TCP/IP address would be possible by means of a further column "MAC address". Alternatively, authentication can also be performed exclusively via the MAC address, in the case that dynamic TCP/IP addresses are used. Connection rejection always means that no interlocking of the mobile unit takes place.

In a further development stage, it is also conceivable to carry out a so-called "black list" which is to refuse possible connections that are statutory according to the basic list. For this purpose, a further table can be defined, which contains pairs of mobile units which are not allowed to be connected to each other. For pairs not listed, a connection is allowed.

Example

TABLE 2

| Black list: | | | |
|---|---|---|---|
| # | Name-mobile | | Name-stationary |
| 1 | tablet1 | | devicehub2 |
| 2 | ... | | ... |
| 3 | tablet3 | | * |

For example, the above table defines:
the mobile unit tablet1 must never connect to the stationary unit devicehub2 (line 1).

This can be useful, for example, if the tablets of operating personnel in the first floor of a department store want to connect to the stationary units of the second floor, but this is not wanted. Then all combinations of the tablets of the first floor with the stationary units of the second floor would be entered into the "black list":
that the mobile unit tablet3 is not allowed to connect to any stationary unit.

This can be useful, for example, if a tablet has been lost due to theft.

Instead of a black list, a white list table is also conceivable: the combinations of mobile and stationary units, which are only allowed, are then enumerated. All other combinations are not allowed.

As a further design stage of the set of rules, it is conceivable that connections from mobile units to stationary units can only take place at certain times (e.g. Opening times, working hours, vacation times, shift times, etc.—are permitted. This can for instance be achieved by an additional table that is defining corresponding time windows:

TABLE 3

| Timing: | | |
|---|---|---|
| # Name-mobile | time | Days of the week |
| 1 tablet1 | 8:00-12:00, 13:00-20:00 | Mo, Tu, We, Thu, Fr |
| 2 tablet2 | 8:00-12:00, 13:00-16:00 | Sa, Su |
| 3 ... | ... | ... |

The table contains the times for all mobile units in which connections to stationary units are allowable.

Outside the defined time windows, connection requests are rejected. If an mobile unit that is already connected is connected to a stationary unit and the user exceeds the defined time window, it is useful not to automatically perform a connection termination, but rather:

only after the explicit, intended end of the connection by the user, or to perform an automatic connection termination after a defined period of inactivity of the mobile unit.

This approach is useful in order to complete a sales transaction that has already begun and to terminate the necessary control of the periphery.

As a further embodiment of the rule set, it is conceivable to extend the authentication of permitted connections to a user control. Particularly when mobile units are not exactly assigned to one user and several operating forces share mobile units at different working times. Here, tables 2, 3 can be extended by a further column "Users" which are then used for evaluation.

| Example Table 2b - as Black List: | | | |
|---|---|---|---|
| # | Name-mobile | Name-stationary | User |
| 1 | tablet1 | devicehub2 | |
| 2 | ... | ... | |
| 3 | tablet3 | * | |
| 4 | tablet2 | * | User1 |
| 5 | * | * | User2 |

The query could be as follows:

if the row entry in the "User" column of Table 2 is empty, the rule applies to all users.

if the row entry in the User column of Table 2 contains one or more users, the rule is only valid if the current user name is one with the User column.

In the example of table 2b, the additional entry in line 4 causes the mobile unit "tablet2" to be no longer used for the drive of the stationary unit for the user 1.

In the example table 2b, the add-on entry in line 5 causes all mobile units for the user 2 to be no longer used for controlling any stationary units.

The same can be defined for Table 3.

As a further design stage of the rule set it is conceivable to define the authentication of permitted connections not only between mobile and stationary units with reference to the stationary unit, but additionally to extend the authentication to the connected peripheral units. Furthermore, it can, e.g., be defined that certain users only have access to the cash drawer, since they are authorized as collector to handle cash rather than just for example a consultant who is allowed to use peripherals such as the printer, the display, and the scanner.

The rule set is then be expanded in such a way that, if the result "connection allowed" has been generated in the case of an evaluation carried out with the other rules, a further table is searched in order to determine which of the peripheral devices can be used.

| Example Table 4 - Peripheral Control: | | | |
|---|---|---|---|
| # | Name-mobile | User | Peripheral unit |
| 1 | tablet1 | User1 | Scanner, Printer, LineDisplay |
| 2 | tablet1 | UserBoss | * |
| 3 | tablet1 | User3 | Scanner, Printer, Line Display |
| 4 | tablet2 | * | * |

In this example, the following rules are defined:

Line 1: If a connection setup for the tablet is classified to be "allowed" to a stationary unit with the previous rules as "in the name-mobile" column, and the user "User1" has logged in, the access to the peripheral equipment scanners, printers, line display is granted. The cash drawer and the scale cannot be controlled by the user.

Line 2: If a connection set-up for the tablet is classified as "allowed" to a stationary unit with the previous rules as "allowed" in the column "Name-mobile", and the user "UserBoss" Access all I/O devices (e.g. an open cash drawer).

Line 3 describes the same rule as line 1, but for the user "user3"

Line 4: If the Tablet 2 is used and the previous rules have classified a connection set as "allowed", each user is allowed to access all peripheral devices.

How the tablets that are not listed in this table are treated ultimately depends on the definition of the rules. It is conceivable that this rule extension leads to the fact that the connection is again classified as "not allowed" for all rules not listed above.

Alternatively, it is also conceivable that non-listed tablets cause this rule not to be applied, but the result of the previous rules is used as the final result.

In a further embodiment of the rule set, it is conceivable that an access to the cash drawer can only be effective if a minimum distance between the mobile unit and the stationary unit with the cash drawer connected thereto is ensured. For this purpose, a so-called Ibeacon™ can be attached to the cash drawer or the stationary unit. This sends a unique identification number (UUID). The mobile input device can then use the signal strength to determine the distance from which the stationary device and the cashbox connected thereto are located. The following table shows a possible parameterization of the rule set:

| Example Table 5 - Distance-dependent access to the cash drawer: | | | |
|---|---|---|---|
| # | Distance Status | Access to cash drawer | Peripheral unit |
| 1 | Unknown | Not granted | Cash drawer |
| 2 | Far (to 30 m) | Not granted | * |
| 3 | Near (to 2 m) | granted | * |
| 4 | Immediate (to 50 cm) | granted | * |

Figure 5:
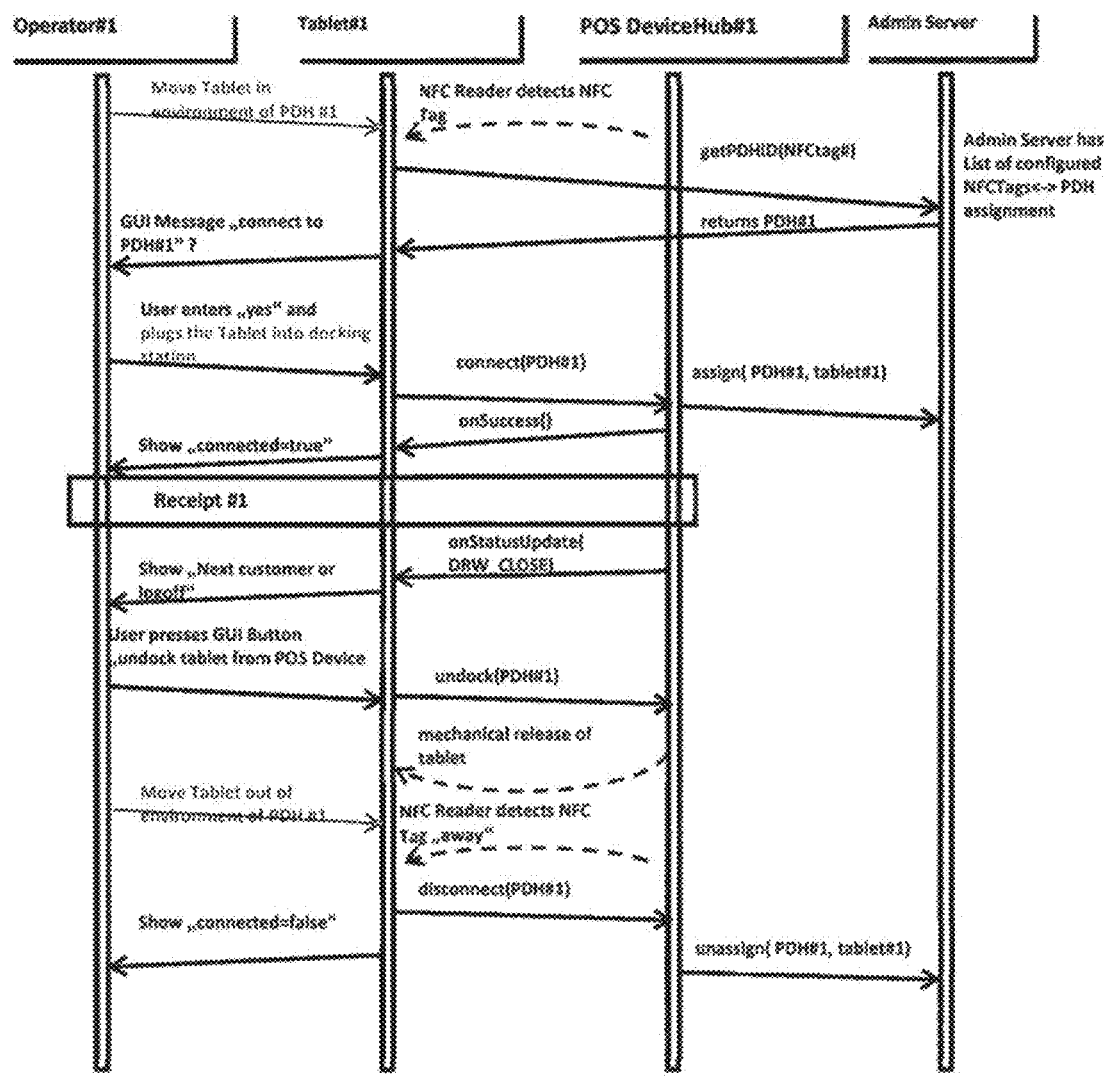
FIG. 5 shows the steps of a method in which a mobile unit connects to the stationary unit (POS), wherein the management unit (server) is integrated into the steps, a user intervenes in the steps by means of corresponding user interfaces with dialogs.

FIG. 5 shows a corresponding exemplary sequence of steps for a Windows operating system. Alternatively, the method can also be implemented on other operating systems such as Linux, Unix, iOS, Blackberry and/or Android.

The user moves with the mobile unit in the direction of the stationary unit/POS device HUB
or alternatively
The mobile unit is plugged into the docking unit of the stationary unit/POS device HUB.
The NFC reader of the mobile unit detects the NFC tag of the POS device HUB, which contains the device ID with a minimum length of 64 bits.
The mobile unit receives a message from the NFC Reader with tag #. With this tag, the administration unit/admin server is contacted in order to obtain the name of the assigned stationary device. The function is POSDeviceHUB (getPDHID (NFCtag #)), it should be noted that the name of the POS device HUB can alternatively be obtained from a central point in the store provided by the POS application server.
The tablet/mobile unit connects to the POS Device Hub via the virtual driver with its name and is ready for the next transaction.
Performing a transaction (receipt): scanning goods, entering goods, determining the total amount, printing the receipt document, opening the cash drawer, calculating the bill of exchange, and closing the cash drawer.
The user moves with the mobile unit away from the POS device HUB.
or alternatively:
the user presses the "undock" button in the user interface of the mobile unit; the docking unit of the POS device HUB releases the mobile unit and the user moves with the mobile unit away from the POS device HUB.
The NFC reader of the mobile unit, detects the absence of the NFC tag of the POS device HUB.
The mobile unit is detached from the POS Device Hub and is ready for another transaction.

In this method, it has been described how the mobile unit can be connected to the stationary unit with the integration of the management unit.

In the following, the invention is described by the claims, which are to be interpreted in a broadest form. The scope of protection is determined according to the claims. The description is not intended to be limiting to scope of protection.

What is claimed is:

1. A point of sale ("POS") system comprising:
at least one POS peripheral unit being a cash drawer;
a stationary unit which is connected by at least one connection to the at least one POS peripheral unit;
a beacon can be attached to the at least one POS peripheral unit or the stationary unit;
a mobile unit comprising a display device, as well as an input device, wherein the mobile unit being configured to execute a POS software and thereby access to the at least one POS peripheral unit;
a management unit; and
wherein:
  the mobile unit is connectable to the stationary unit via a first connection,
  the mobile unit is connectable to the management unit via a second connection,
  the stationary unit is connectable to the management unit via a third connection,
  the management unit is configured to check, based on a rules set, if a first logical connection of the mobile unit to the stationary unit and a second logical connection of the mobile unit to the at least one POS peripheral unit is to be set up, and if the check is successful, access is granted from the mobile unit to the stationary unit via the first logical connection and access is granted from the mobile unit to the POS peripheral unit via the second logical connection, and the management unit registers the corresponding logical connections of the units,
  the beacon sends a unique identification number having a signal strength and the mobile unit uses the signal strength to determine a distance from which the at least one POS peripheral unit or the stationary unit is located and, if the mobile unit is too far away, such that there is no radio contact with the stationary unit, the stationary unit then notifies the management unit thereof and the management unit or the stationary unit can then decide that the connection between the at least one POS peripheral unit and the mobile unit is cancelled.

2. The POS system as claimed in claim 1, wherein the mobile unit is connectable to the stationary unit via the first connection, wherein the units are configured to send a request to the management unit when establishing the connection for determining whether a connection of the mobile unit to the stationary unit and to its POS peripheral unit is grantable based on the rules set, and when it is grantable, the management unit is configured to transmit a corresponding message to the mobile unit and the stationary unit to grant access via the logical links.

3. The POS system according to claim 2, wherein the management unit is configured to receive both a request via the second connection from the mobile unit and in parallel a request via the third link from the stationary unit to allow access via the logical links.

4. The POS system according to claim 1, wherein an ID of the mobile unit and an ID of the stationary unit are recordable and transmittable to the management unit for identification, and wherein the stationary unit and the mobile unit have to communicate with the management unit within a defined period of time.

5. The POS system according to claim 1, wherein the mobile unit or the stationary unit are configured to transmit an ID via a physical contact connection or wireless local area connection which can be NFC, RFID, Zigbee, Bluetooth and Bluetooth low energy, in order to then transmit the ID to the management unit via a network, which can be WLAN, Ethernet or Bluetooth.

6. The POS system according to claim 1, wherein the first connection and a physical connection is arranged between the mobile units, the stationary unit, the management unit or the POS peripheral unit as an encrypted connection, and wherein the management unit is preferably configured to transmit keys of an encryption key pair to the mobile unit and stationary unit, and can also be configured to generate them.

7. The POS system according to claim 1, wherein a virtual interface, which can be RS232 or USB, of the POS system application is provided on the mobile unit which is configured to establish a logical connection to the stationary unit and POS peripheral unit, and the authentication is carried out via the management unit.

8. The POS system according to claim 1, wherein by a rule set verifies whether the allocation, the ID, the timing, the spatial distance, the user login and the category of the POS peripheral unit are allowable in order to grant a connection.

9. The POS system according to claim 1, wherein the mobile unit is configured to allow an interactive selection of stationary units and POS peripheral units, and/or wherein a physical interlock is provided to physically to establish a interlock after a physical connection of the stationary unit to the mobile unit, wherein the lock being controlled by the management unit according to the rule set.

* * * * *